March 18, 1930.  L. MASON  1,751,344
DRIP PAN
Filed Dec. 15, 1928
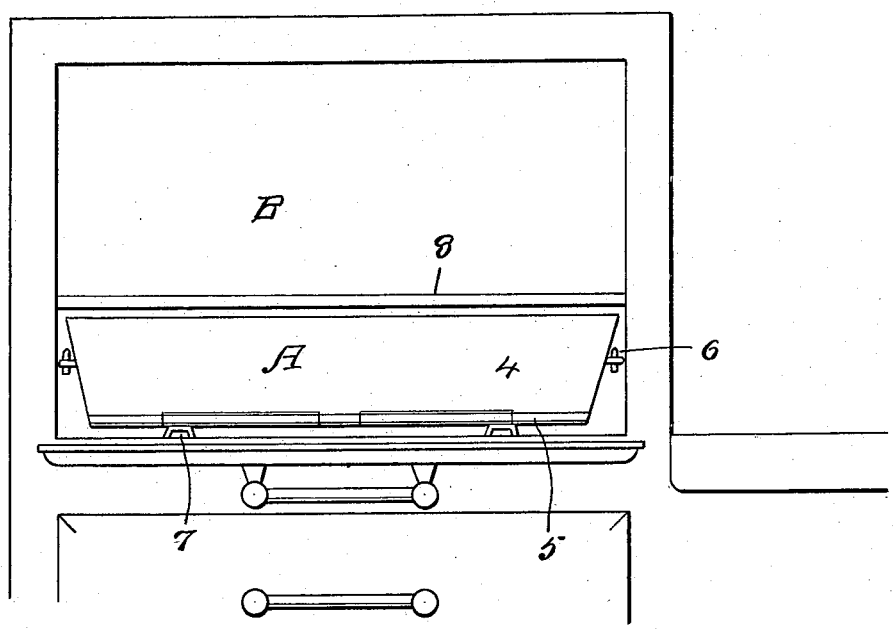
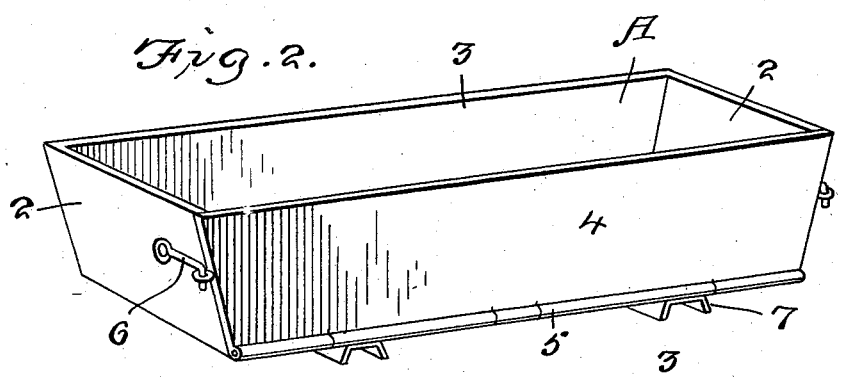
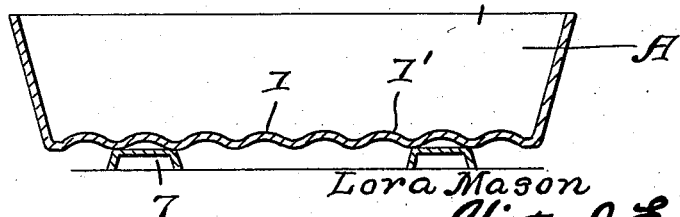
Lora Mason INVENTOR
BY Victor J. Evans ATTORNEY Patented Mar. 18, 1930

1,751,344

UNITED STATES PATENT OFFICE

LORA MASON, OF JACKSONVILLE, ILLINOIS

DRIP PAN

Application filed December 15, 1928. Serial No. 326,358.

This invention relates to a drip pan, the general object of the invention being to provide a pan which is adapted to be placed in an oven under a pan containing material to be baked and which is of such a nature that liquids are liable to overflow the pan, whereby this liquid will be caught in the drip pan and thus be prevented from collecting in the bottom of the oven.

Another object of the invention is to so form the drip pan that the liquid therein can be easily removed and the pan cleaned.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a partial view of a stove, showing the drip pan in the oven thereof.

Figure 2 is a perspective view of the pan.

Figure 3 is a longitudinal sectional view thereof.

As shown in these views, the drip pan A is composed of the bottom 1, the end pieces 2 and the side pieces 3 and 4. The side 4 is hingedly connected with the bottom, as shown at 5, so that this side can be swung downwardly, latches 6 being provided for holding the side 4 in closed position. Channel-shaped strips 7 are fastened to the bottom of the pan, with their flanges extending downwardly, these strips acting to support the pan on the bottom of the oven B of the stove, as shown in Figure 1, with the bottom of the pan spaced from the bottom of the oven. The bottom of the pan may be corrugated, as shown at 1' in Figure 3.

Thus it will be seen that when the pan is placed under the grid 8 of the oven and a pan or the like is placed on the grid, any juices or liquids dropping from this pan will be caught in the drip pan A and thus be prevented from soiling the oven. The hinged side 4 of the drip pan provides means for emptying the pan and facilitating cleaning of the same.

It is though from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A drip pan comprising a bottom, a side and a pair of end pieces rigidly connected with the bottom, a second side hingedly connected at its lower edge with the bottom, latch means for holding said hinged side in raised position and inverted channel-shaped strips having their bight portions connected with the lower face of the bottom and extending transversely of the pan.

In testimony whereof I affix my signature.

LORA MASON.